United States Patent
Hultholm et al.

(10) Patent No.: US 7,749,302 B2
(45) Date of Patent: Jul. 6, 2010

(54) METHOD FOR THE HYDROMETALLURGICAL TREATMENT OF SULFIDE CONCENTRATE CONTAINING SEVERAL VALUABLE METALS

(75) Inventors: Stig-Erik Hultholm, Pori (FI); Olli Hyvärinen, Pori (FI)

(73) Assignee: Outotec Oyj, Espoo (FI)

( * ) Notice: Subject to any disclaimer, the term of this patent is extended or adjusted under 35 U.S.C. 154(b) by 131 days.

(21) Appl. No.: 11/794,197

(22) PCT Filed: Dec. 21, 2005

(86) PCT No.: PCT/FI2005/000542
§ 371 (c)(1),
(2), (4) Date: Jun. 26, 2007

(87) PCT Pub. No.: WO2006/070052
PCT Pub. Date: Jul. 6, 2006

(65) Prior Publication Data
US 2008/0170976 A1    Jul. 17, 2008

(30) Foreign Application Priority Data
Dec. 28, 2004   (FI) .................................. 20041673

(51) Int. Cl.
| | |
|---|---|
| C22B 15/00 | (2006.01) |
| C22B 13/00 | (2006.01) |
| C22B 19/20 | (2006.01) |
| C22B 23/00 | (2006.01) |
| C01G 3/02 | (2006.01) |
| C01G 3/04 | (2006.01) |
| C01G 9/06 | (2006.01) |
| C01G 21/00 | (2006.01) |
| C01G 51/00 | (2006.01) |
| C01G 53/10 | (2006.01) |

(52) U.S. Cl. .............................. 75/743; 423/27; 423/38; 423/98; 423/109; 423/139; 423/140; 423/150.1

(58) Field of Classification Search .................. 423/27, 423/109; 75/740, 743
See application file for complete search history.

(56) References Cited

U.S. PATENT DOCUMENTS

| | | | | |
|---|---|---|---|---|
| 1,937,633 | A | * 12/1933 | Christensen | ................ 205/606 |
| 4,054,638 | A | * 10/1977 | Dreulle et al. | ................. 423/39 |
| 4,063,933 | A | 12/1977 | Peters | |
| 4,337,226 | A | 6/1982 | Peasley et al. | |
| 4,401,531 | A | * 8/1983 | Martin San Lorenzo et al. . | 423/106 |
| 4,571,262 | A | 2/1986 | Kerfoot et al. | |
| 5,078,786 | A | * 1/1992 | Peters et al. | ................... 75/432 |
| 5,344,479 | A | 9/1994 | Kerfoot et al. | |

(Continued)

FOREIGN PATENT DOCUMENTS

WO    2003/091463    11/2003

*Primary Examiner*—Jerry Lorengo
*Assistant Examiner*—Jared Wood
(74) *Attorney, Agent, or Firm*—Buchanan Ingersoll & Rooney PC

(57) ABSTRACT

The invention relates to a method, by means of which the valuable metals contained in a sulphidic, multicomponent concentrate are recovered using hydrometallurgical treatment. One constituent of the concentrate is copper sulphide, which is leached using an alkali chloride-copper (II) chloride solution. The sulphides of other valuable metals, such as zinc, nickel, cobalt and lead are leached before copper leaching and each is recovered as a separate product before copper recovery.

19 Claims, 2 Drawing Sheets

U.S. PATENT DOCUMENTS 5,487,819 A    1/1996  Everett
6,007,600 A *  12/1999 Hyvarinen et al. ............ 75/740
RE37,251 E *   7/2001  Jones ......................... 205/579
2004/0250655 A1* 12/2004 Hamalainen ................. 75/743

* cited by examiner

METHOD FOR THE HYDROMETALLURGICAL TREATMENT OF SULFIDE CONCENTRATE CONTAINING SEVERAL VALUABLE METALS

BACKGROUND

1. Field

Disclosed herein is a method whereby the valuable metals contained in a sulphidic concentrate are recovered from a concentrate that contains several valuable metals, using hydrometallurgical treatment. One constituent of the concentrate is copper sulphide, which is leached with an alkali chloride-copper (II) chloride solution. The sulphides of other valuable metals, such as zinc, nickel, cobalt and lead are leached before copper leaching and are each recovered as a separate product before copper recovery.

2. Description of Related Art

U.S. Pat. No. 6,007,600 describes the method developed by Outokumpu Oyj for the hydrometallurgical fabrication of copper from a copper-containing raw material such as copper sulphide concentrate. According to the method, the raw material is leached using countercurrent leaching with a concentrated alkali chloride-copper (II) chloride solution in several stages to form a copper (I) chloride solution. Since there are always both divalent cupric chloride and impurities formed from other metals remaining in solution, reduction of the divalent copper and solution purification is performed on the solution. The pure copper (I) chloride solution is precipitated by means of alkali hydroxide into copper (I) oxide and the oxide is reduced further to elemental copper. The alkali chloride solution formed during copper (I) oxide precipitation is further treated in chlorine-alkali electrolysis, from which the chlorine gas and/or chloride solution obtained is used for raw material leaching, the sodium hydroxide formed in electrolysis is used for oxidule precipitation, and the hydrogen produced for the reduction of copper into elemental copper. The method is called the HydroCopper™ process. U.S. Pat. No. 6,007,600 refers to the recovery method of copper as a whole, but it relates mainly to pure copper sulphide concentrates.

U.S. Pat. No. 5,487,819 describes the method developed by Intec Ltd for the hydrometallurgical fabrication of copper from raw materials such as sulphide concentrate that contain copper and possibly other valuable materials. According to the method the raw material is leached in counter-current leaching with a sodium chloride-copper chloride solution in several stages. If there are other sulphides in the raw material apart from copper sulphide, the method describes that the other sulphides are leached in the first stage of leaching, from which stage the solution is removed for further treatment. Leaching of the undissolved raw material continues, forming a copper (I) chloride solution and precipitate containing iron and sulphur. The further treatment of the solution exiting the first leaching stage comprises thickening and, after filtering, the removal of silver and mercury for instance. In the second stage, iron, arsenic, bismuth, mercury, antimony etc are removed by known methods. When the solution includes lead and zinc, the lead is recovered first with a separate electrolysis, and subsequently the zinc is recovered from the solution in another electrolysis. According to the publication, metal is produced on the cathode in both electrolyses, and the cathode is wiped so that both lead and zinc are removed in particulate form from the bottom of the cell.

The recovery of zinc and lead in electrolysis, in which particle-like metal is produced, is probably not in commercial use. There are difficulties in implementing it in practice in every case. The method also involves several halides in the solution entering electrolysis, which in the electrolyses form halide complexes such as $BrCl_2^-$. Although the formation of bromide complexes is advantageous from the point of view of raw material leaching, it causes considerable problems related to work hygiene.

SUMMARY

One advantage of the method described herein is the ability to recover from a sulphide concentrate at least one other valuable metal contained in the concentrate in addition to copper. The recovery of the other valuable metal occurs in a sulphate milieu as a technically viable sub-process connected to the copper recovery process, which does not cause problems to either the environment or the equipment.

Disclosed herein is a method for the recovery of copper and at least one other valuable metal from a concentrate containing several valuable metals by means of hydrometallurgical treatment. The other valuable metals contained in the concentrate include at least one of the following: zinc, nickel, lead and cobalt. The concentrate is first routed to leaching treatment, where at least one valuable metal other than copper is recovered from said concentrate, preferably in a sulphate milieu.

In the recovery stages of the other valuable metal, copper sulphide remains largely undissolved and is routed to leaching, where it is leached with a concentrated alkali chloride-copper (II) chloride solution and the copper (I) chloride solution generated is cleaned of impurities. Copper (I) oxide is precipitated from the copper (I) chloride solution by means of alkali hydroxide. The alkali chloride solution formed during copper (I) oxide precipitation is routed to chlorine-alkali electrolysis to produce the chlorine, alkali hydroxide and hydrogen required in raw material leaching and copper recovery. The copper (I) oxide that is generated is reduced to metallic copper in an appropriate way.

DETAILED DESCRIPTION OF SPECIFIC EMBODIMENTS

Disclosed herein is a method whereby at least one other valuable metal in addition to copper is recovered from a sulphide concentrate. The other valuable metal is at least one out of the group zinc, nickel, lead and cobalt. The concentrate may also contain precious metals (gold and PGM i.e. mainly platinum and palladium).

Figure 1:
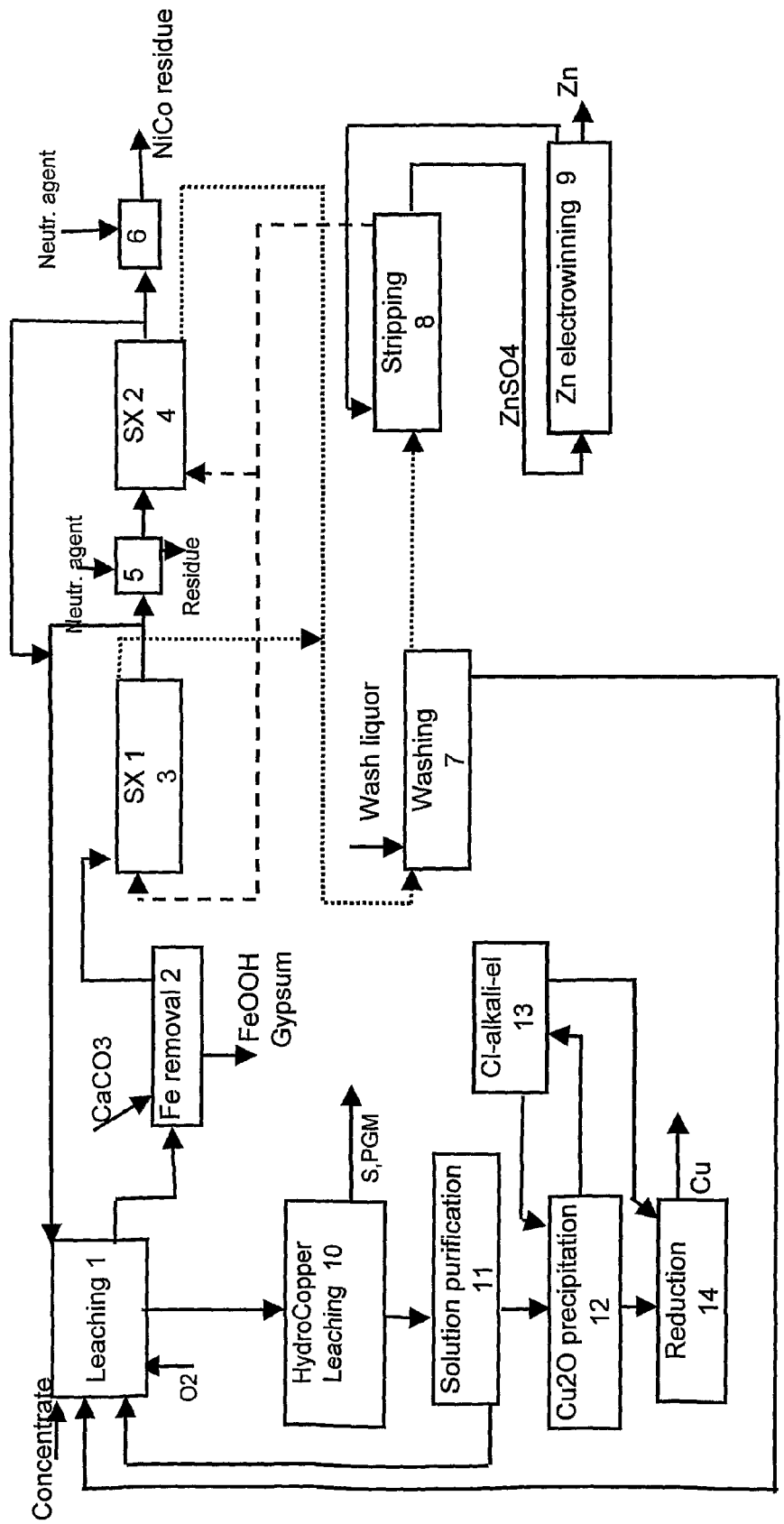
FIG. 1 shows a flow chart of an embodiment disclosed herein, in which copper-zinc sulphide concentrate is treated.

When copper-zinc sulphide concentrate is concerned, the amount of copper is usually about double, or even triple, that of zinc. This kind of concentrate has a composition for instance as follows: Cu 14%, Zn 3.4%, Fe 35%, S 42%, Pb 0.5%, As 0.3% and Sb 0.1%. FIG. 1 shows a diagram of an exemplary embodiment of zinc-containing copper-zinc concentrate leaching. The bulk concentrate is first routed to zinc concentrate leaching stage 1, which is preferably sulphate-based. Leaching is performed with the aqueous solution exiting zinc extraction i.e. the raffinate solution, the sulphuric acid concentration of which is determined according to the extracted zinc and is in the range of 40-50 g/l. Leaching takes place in atmospheric conditions at a temperature between 80°

C. and the boiling point of the solution or at a temperature of 100-150° C. in a pressurised space. An oxidising gas, such as air or oxygen, is fed into the stage and this raises the oxidation-reduction potential of the solution to a range of 350-450 mV vs. Ag/AgCl electrode. Zinc dissolves as zinc sulphate and at the same time a small part of the iron and copper of the concentrate may also dissolve. However, the majority of the copper sulphide remains undissolved in these conditions, as do any precious metals that may be contained in the concentrate. Leaching is performed as necessary in one or several stages. It is advantageous to perform iron removal 2 on the formed solution, using limestone for instance, whereupon a precipitate is obtained which comprises goethite, FeOOH and gypsum, $CaSO_4 \cdot 2H_2O$. The precipitate is removed from the circuit.

In order to clean the resulting zinc sulphate solution of other metals, the solution is routed to liquid-liquid extraction. Extraction is carried out using some known extractant that is selective for zinc. One such extractant is for example di-(2-ethylhexyl) phosphoric acid (D2EHPA). Extraction can be either single-stage or preferably two-stage as shown in FIG. 1 where SX1 and SX2 are the two extraction stages. In the figure, the extraction solution is shown by a dotted line and the aqueous solution by a solid line. Most of the aqueous solution or raffinate exiting the first extraction stage 3 is routed back to zinc concentrate leaching 1. In two-stage extraction, the part of the aqueous stream that is fed into the second extraction stage 4 is preferably neutralised before the second extraction stage, since acid is formed in the solution during the extraction reactions. Neutralisation 5 occurs using some appropriate alkali such as limestone or lye. The raffinate solution also contains a small amount of other dissolved metals such as nickel, cobalt and copper. If the amount of these metals in the solution returning from extraction rises, it is preferable that a bleed of the aqueous solution is taken from the final extraction stage, into which a neutralising agent is fed and the metals are precipitated out 6. The nickel-cobalt residue formed during precipitation is routed onwards for processing, and if there is a significant amount of copper, the residue can be routed to a copper leaching process.

It is preferable to route the zinc-rich extraction solution to washing 7, where it is washed with a dilute solution of sulphuric acid in order to remove the metals critical to zinc electrolysis. The aqueous solution leaving the washing stage is routed to bulk concentrate leaching and the extraction solution to stripping 8. In stripping the zinc is extracted from the extraction solution into the zinc electrolysis anolyte or return acid and the pure aqueous solution of zinc sulphate obtained is routed to electrowinning 9. After stripping, the extraction solution is routed back again to the extraction stage. Zinc is recovered as a metal from electrowinning in cathode form.

The recovery of zinc in a sulphate milieu is a well-known and reliable method, and the present inventors have found that combining it with the recovery of copper in a chloride milieu does not cause any problems.

The recovery of copper from a mainly sulphidic raw material, from which zinc is leached, is done preferably by means of the HydroCopper process. In that case the concentrate leaching occurs as a countercurrent leaching 10 with a concentrated alkali chloride-copper (II) chloride solution. In the reactions that take place during leaching the compounds contained in the concentrate decompose and as a result of the reactions, the elemental sulphur and iron compounds that are formed as well as gold and PGM remain in the precipitate. The copper (I) chloride solution that is generated in leaching is cleaned of impurities. In solution purification 11 the zinc and lead that dissolved with the copper are precipitated out of the solution by known methods. Copper (I) oxide is precipitated from the pure copper (I) chloride solution by means of alkali hydroxide in the precipitation stage 12. The alkali chloride solution formed in copper (I) oxide precipitation is routed to chlorine-alkali electrolysis 13 to produce the chlorine, alkali hydroxide and hydrogen required in raw material leaching and copper recovery. The copper (I) oxide generated is reduced 14 in an appropriate way to metallic copper. If precious metals, particularly gold, are present in a multi-component concentrate, it is also possible to recover them, for instance with the method described in WO patent application 03/091463, which relates to the HydroCopper process.

Figure 2:
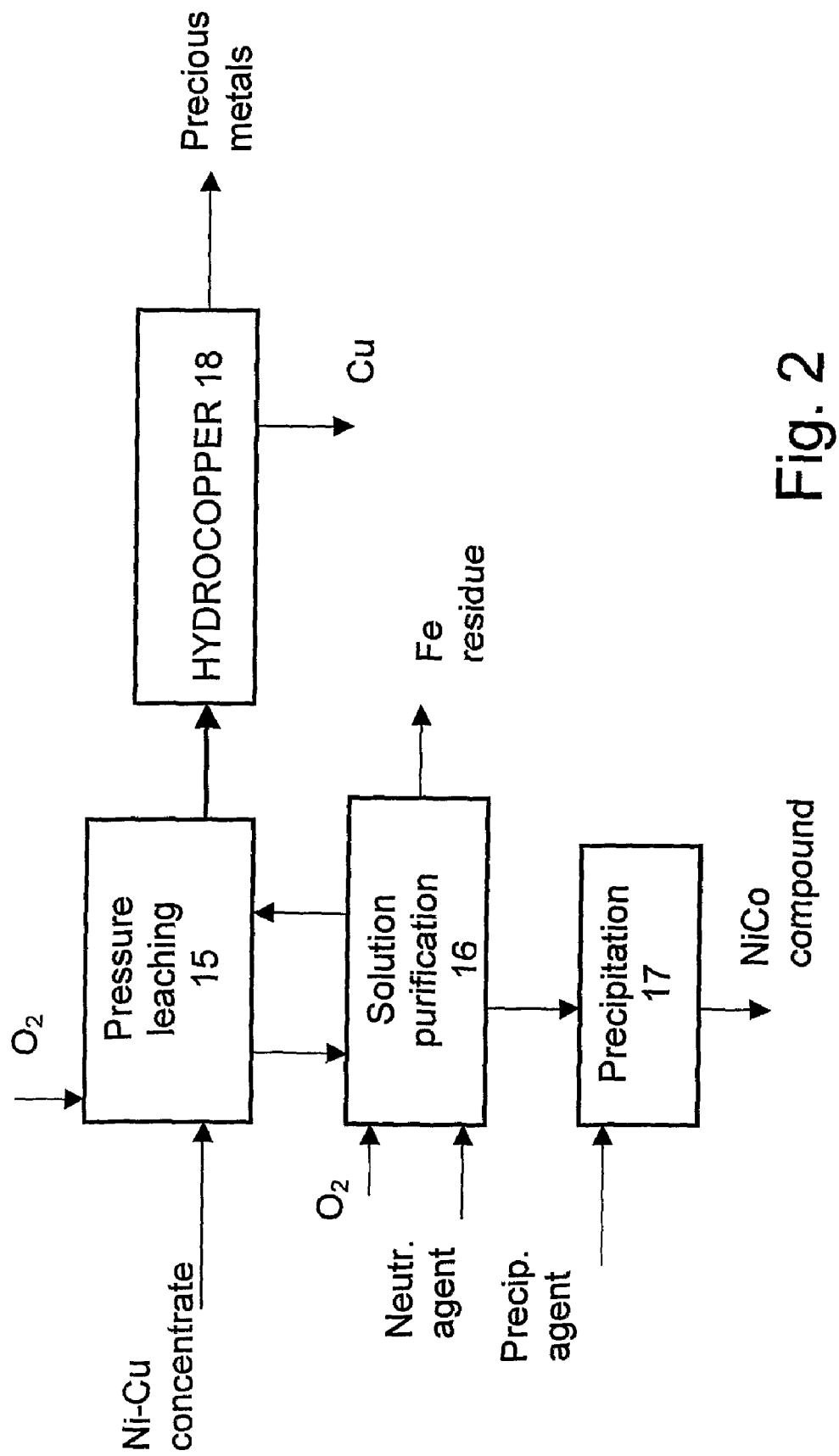
FIG. 2 shows a flow chart of another embodiment disclosed herein, in which copper-nickel concentrate is treated.

When a multi-component concentrate includes mainly nickel in addition to copper, the ratio of the copper and nickel in the concentrate is generally around 2:1. Such a concentrate has a composition of e.g. Cu 8.3%, Ni 4.1%, Co 0.15%, Fe 38% and S 27%. Nickel can also be recovered from a bulk concentrate with suitable pretreatment before the actual copper recovery and this is presented in the flow chart in FIG. 2. A nickel-containing concentrate often also contains cobalt and cobalt follows nickel in its different recovery stages. It is advantageous to route the concentrate to a pressure leaching stage 15, which takes place in a sulphate milieu, where the temperature is kept between about 110-150° C. The oxidising conditions are adjusted at the beginning of the leaching stage by means of oxygen-containing gas so that the partial pressure of oxygen is preferably around 2-5 bar. The final stage of leaching is adjusted to be non-oxidising, so that the copper that dissolved in oxidising conditions reacts with the remaining undissolved sulphides. As a result, the nickel and iron dissolve and the copper is precipitated back into the final residue.

The adjustment of the leaching stage takes place by measuring the redox potential. In the initial stage of leaching, the potential is adjusted to be within the range of 450-550 mV vs. Ag/AgCl electrode by means of oxygen feed. Part of the copper also dissolves in oxidising conditions. Dissolved copper is precipitated out in the final stage of pressure leaching by reducing the redox potential to a value between 350-450 mV. The potential is lowered by ending the feed of oxygen into the autoclave. At the end of the leaching stage the temperature is made to rise, so that the total pressure remains the same even though the oxygen feed is stopped. In practice the temperature is raised to a value of 135-150° C. The residue that is formed in leaching is routed to the copper recovery process.

Pressure leaching in a sulphate milieu does not cause the kinds of corrosion problems in the equipment that are caused by pressure leaching in a chloride milieu.

Solution purification 16 is performed on the solution containing nickel sulphate, cobalt sulphate and iron sulphate, and is largely an iron removal step. It is done by oxidising iron to trivalent using air or oxygen and precipitating the iron out of the solution afterwards by neutralising the solution. A suitable neutralizing agent is for example limestone or lime milk, or some other suitable alkali. Iron precipitation takes place at a pH value of about 3.

After iron precipitation, the nickel and cobalt are recovered from the solution. One way to recover nickel and cobalt is precipitation, whereby some precipitation agent is fed into the solution. Lime milk, $Ca(OH)_2$, is a preferred precipitation agent, with which the pH is raised to a value of about 7, and thus the nickel and cobalt are recovered as nickel-cobalt hydroxide. The gypsum that is formed at the same time is coarse and is separated from the hydroxide by cycloning. Precipitation can also be done with soda, $Na_2CO_3$, whereupon nickel and cobalt are precipitated as carbonate.

Copper recovery from the residue takes place in the same way in the HydroCopper process as is described above in connection with zinc-copper bulk concentrate treatment, and the HydroCopper process 18 is not shown in detail in this flow chart.

Lead is also often present in nickel-copper concentrates and in copper concentrates. In sulphate leaching the lead contained in the concentrates dissolves and precipitates out simultaneously as lead sulphate. Lead sulphate dissolves in the HydroCopper process leaching. Lead can be recovered in the HydroCopper process solution purification by means of cooling crystallization in the first stage of solution purification.

The embodiments described herein can be more clearly understood by reference to the following examples, which are not intended to limit the scope of the appended claims.

EXAMPLES

Example 1

A sulphide concentrate, with a composition of 12.6% Cu, 10.2% Zn, 26.8% Fe and 40% S plus 1.2% Pb, 0.3% As and 0.1% Sb, was treated using the first embodiment disclosed herein. The concentrate was leached at a temperature of 90.degree. C. and a redox potential of 400 mV vs. Ag/AgCl, which was maintained by the blowing of oxygen-containing gas. The results show that zinc was made to leach extremely well, and only a small portion of sulphur was oxidised into sulphate whereas the majority of sulphur bound to the zinc sulphide formed elemental sulphur. The reaction rate in a reactor equipped with good mixing was high and the reaction degree was over 90% to zinc in just 12 hours. The composition of the leaching residue was: Cu 14%, Zn 0.1%, Fe 30%, S 44%. The Zn content of the solution exiting extraction that was used for leaching, i.e. the raffinate, was 40 g/l, the sulphuric acid concentration 40 g/l and the quantity 4 l/kg of concentrate. Leaching produced a solution with a Zn content of 65 g/l, Fe content of 0.9 g/l and $H_2SO_4$ concentration of about 2 g/l. Iron removal was also carried out on the solution, in which finely ground limestone was added to the solution, which precipitated the iron completely. The amount required was 22 g/kg of concentrate.

In extraction, about 40% of the zinc was extracted in the first extraction step without neutralisation, after which the majority of the aqueous solution was pumped back to leaching and the smaller part, the amount of which is determined largely according to the cobalt and nickel contents (i.e. in this case a very small amount), was routed to the second extraction step, where all the remaining zinc was extracted. Before the second extraction step, the aqueous solution was neutralised with lye, NaOH, or with limestone, $CaCO_3$. After the first extraction step the Zn content of the extraction solution was 40 g/l.

In both extraction steps the temperature was maintained at a value of about 50.degree. C. A high temperature is advantageous to extraction reactions especially in stripping. D2EHPA withstands a very high temperature and its increase is restricted mainly by the evaporation of the solvent. The organic solutions of both extraction steps were combined and washed with dilute sulphuric acid-water to remove cobalt and nickel. The washing solution was pumped to concentrate leaching. After washing, the zinc-bearing organic solution was routed to stripping, where the zinc was stripped from the organic solution into the zinc electrolysis return acid. The stripped organic solution was returned to the extraction steps. In zinc electrolysis 100 g of super-pure cathode zinc was produced per kg of concentrate, i.e. almost the same amount that was extracted and fed into the process as concentrate. The raffinate from the second extraction step, which contains nickel and cobalt as well as other impurities, was routed to hydroxide precipitation. Nickel, cobalt and other metal cations such as copper were precipitated with lye. The amount of lye required was small.

A leaching residue was generated in leaching, which contained the copper, iron, lead, arsenic, antimony, PGM and a small amount of zinc from the concentrate. The majority of the sulphur was sulphidic sulphur and some was also present as elemental sulphur. Some of the iron was as goethite or hematite and siliceous minerals were almost unchanged. Copper was recovered from this sulphidic material using the HydroCopper process. Lead and zinc dissolved in HydroCopper leaching in addition to copper. Lead was separated by crystallisation from the copper (I) chloride solution. Zinc was precipitated as carbonate using sodium carbonate. After washing the residue was fed to zinc leaching. Copper (I) oxide was precipitated from the purified copper (I) chloride solution, and was reduced with hydrogen in a furnace to copper powder. 122 g of copper powder was obtained per kilogram of concentrate.

Sulphur and PGMs were separated by flotation from the silicates and iron oxides. The sulphur concentrate that was obtained was treated first by separating the majority of the sulphur and then by re-leaching, whereupon the solutions were returned to the front end of the process. The PGM concentrate, which had the following composition: PGM 20%, Au 2%, Cu 10%, Fe 14%, is easy to sell for further processing or to process into pure metals. The amount was 0.05 g/kg concentrate.

Example 2

A sulphide concentrate, with a composition of 8.2% Cu, 4.1% Ni, 0.15% Co, 39% Fe and 27% S plus 27 ppm PGM was treated with the method of second embodiment disclosed herein. The concentrate was leached into a dilute solution of sulphuric acid at a temperature of 115° C. and a redox potential of 500 mV vs. Ag/AgCl, which was maintained by the blowing of oxygen at a partial oxygen pressure of about 2 bar (total pressure of about 3-4 bar). The sulphuric acid concentration of the feed solution was 10 g/l and the amount 2.5 l/kg concentrate. Leaching was continued by stopping the feed of oxygen, so that the partial oxygen pressure fell, but the total pressure remained the same since the temperature was allowed to rise to 140° C. The copper that had dissolved at this stage reacted with the nickel sulphide, forming a digenite-type copper sulphide. The results showed that nickel can be made to leach very well, since only a small part of the nickel remained undissolved and the solution was left with only a small copper content. The sulphur bound to nickel is mostly oxidised into sulphate. Some of the sulphur bound to iron forms elemental sulphur. Pyrite did not dissolve in the reaction.

The reaction rate in an autoclave equipped with good mixing, such as the OKTOP™. autoclave, was high and the reaction degree to nickel was over 90% in only 8 hours. The composition of the leaching residue was: Cu 8%, Ni 0.1%, Co 0.05%, Fe 30%, S 44%. Leaching produced a solution with an Ni content of 15 g/l, a Co content of 0.5 g/l, Fe content of 0.9 g/l, Cu content of 1 g/l and a sulphuric acid concentration of about 6 g/l.

In solution purification, i.e. iron removal, fine ground limestone was added to the solution exiting the autoclave, enabling the pH of the solution to be raised to 3. At this pH the iron precipitated out completely, and the amount of limestone required was 22 g/kg concentrate.

The purified solution, which contained nickel and cobalt as well as a little copper, was routed to hydroxide precipitation. Nickel, cobalt, copper and other metal cations were precipitated with lime, which enabled the pH of the solution to be raised to 7. The amount of lime required was 43 g CaO/kg concentrate, the majority of which was used for nickel precipitation. 170 g of hydroxide sediment was generated per kilogram of concentrate. The gypsum generated in precipitation was separated from the hydroxide by cycloning. The hydroxide sediment consisted of Ni 52%, Cu 3.5%, Co 2% and Ca 3%. The gypsum sediment consisted of Ca 21%, Ni 2.3%.

Leaching residue was generated in pressure leaching that contained the copper, iron, nickel and a small amount of cobalt, arsenic, antimony and PGM from the concentrate. The majority of the sulphur was sulphidic sulphur and part was elemental sulphur. Some of the iron was present as goethite or hematite and siliceous minerals were almost unchanged. Copper was recovered from this sulphidic material using the HydroCopper process. Nickel and cobalt dissolved in the concentrate leaching stage of the HydroCopper process and they were precipitated out during solution purification as carbonates using sodium carbonate. After washing, the residue that had formed was fed back to nickel concentrate leaching. Copper (I) oxide was precipitated out of the purified copper (I) chloride solution, and was reduced with hydrogen in a furnace to copper powder. 79 g of copper powder was obtained per kilogram of concentrate.

Sulphur and PGMs were separated by flotation from the silicates and iron oxides. The sulphur concentrate that was obtained was treated first by separating the majority of the sulphur and then by re-leaching, whereupon the solutions were returned to the front end of the process. The PGM concentrate, which had the following composition: PGM 20%, Au 2%, Cu 10%, Fe 14%, is easy to sell for further processing or to process into pure metals. The amount was 0.13 g/kg concentrate.

The invention having been described herein with respect to certain specific embodiments and examples, it will be required that other embodiments that do not depart from the spirit of the invention are encompassed by the appended claims.

The invention claimed is:

1. A method for a recovery of valuable metals from a sulphidic concentrate containing copper, zinc, and one or more valuable metals selected from the group consisting of nickel, lead and cobalt, comprising:
   (a) a first leaching, comprising leaching the sulphidic concentrate in a sulphate milieu under oxidising conditions, such that the sulfuric acid concentration is in the range of 40-50 g/l the oxidation-reduction potential of the solution is 350 to 450 mV with reference to an Ag/AgCl electrode, to produce:
      (i) a leaching solution of said zinc and said one or more valuable metals selected from the group consisting of nickel, lead and cobalt, and
      (ii) a leached concentrate containing most of the copper of the concentrate in an undissolved state; and
   (b) a second leaching, comprising:
      (i) leaching the leached concentrate counter-currently with a concentrated alkali chloride-copper (II) chloride solution, thereby generating a copper (I) chloride solution;
      (ii) cleaning impurities from the copper (I) chloride solution that is generated;
      (iii) precipitating copper (I) oxide from the copper (I) chloride solution by contacting the copper (I) chloride solution with an alkali hydroxide, thereby forming an alkali chloride solution and precipitated copper (I) oxide;
      (iv) routing the alkali chloride solution to a chlorine-alkali electrolysis to produce chlorine, alkali hydroxide and hydrogen, which are used in the first leaching, and in copper recovery, and
      (v) reducing the copper (I) oxide to metallic copper.

2. A method according to claim 1, wherein the first leaching comprises leaching at a temperature of between 80° C. and the boiling point of the solution under atmospheric conditions, thereby leaching the zinc from the sulphidic concentrate as zinc sulphate, leaving the leached concentrate as a fraction that contains copper largely undissolved.

3. A method according to claim 2, further comprising precipitating iron from the leaching solution at the end of the first leaching, and removing the precipitated iron.

4. A method according to claim 2, further comprising solution purification of the leaching solution, comprising a liquid-liquid extraction to produce a first raffinate solution containing impurities, and an extraction solution containing zinc sulphate formed during the first leaching, and recycling at least a portion of this first raffinate solution back to the first leaching.

5. A method according to claim 4, wherein the liquid-liquid extraction comprises a first extraction stage and a second extraction stage, wherein the majority of the first raffinate solution exiting the first extraction stage is recycled back to the first leaching, and wherein the minority of the first raffinate solution exiting the first extraction stage is routed to the second extraction stage, thereby producing a second raffinate solution.

6. A method according to claim 5, further comprising neutralizing the minority of the first raffinate solution prior to the minority of the first raffinate solution entering the second extraction stage.

7. A method according to claim 5, further comprising precipitating other valuable metals that were dissolved during the first leaching from the second raffinate solution exiting the second extraction stage.

8. A method according to claim 7, wherein the other valuable metals include nickel, cobalt, or copper.

9. A method according to claim 4, further comprising washing the extraction solution with a dilute solution of acid to produce a washed extraction solution, and then stripping the washed extraction solution to produce a purified zinc sulphate solution.

10. A method according to claim 9, further comprising routing the purified zinc sulphate solution exiting stripping to electrowinning, thereby producing pure elemental zinc.

11. A method according to claim 1, wherein the sulphidic concentrate is a copper-zinc concentrate, and wherein the first leaching comprises leaching at a temperature of 100-150° C. under pressurized conditions, thereby leaching the zinc from the sulphidic concentrate as zinc sulphate leaving the leached concentrate as a fraction that contains copper largely undissolved.

12. A method according to claim 1, wherein the sulphidic concentrate is a copper-nickel concentrate, and wherein the first leaching comprises pressure leaching at a temperature of 110-150° C., whereby nickel in the copper-nickel concentrate is leached into nickel sulphate in the form of a nickel sulphate solution, wherein the first leaching comprises:
   regulating the temperature at the beginning of the first leaching to between 110-130° C. and regulating the oxidation-reduction potential of the first leaching to between 450-550 mV vs. Ag/AgCl electrode by feeding oxidising gas into the leaching; and regulating the oxidation-reduction potential of the first leaching at the end of the first leaching to between 350-450 mV by ending the feed of oxidising gas, whereupon copper that dissolved at the beginning of the first leaching is precipitated out.

13. A method according to claim 12, further comprising regulating the partial pressure of oxygen at the beginning of the first leaching to between 2-5 bar and regulating the total pressure of the end of the first leaching stage to be the same as at the beginning by raising the temperature of the first leaching to between 135-150° C.

14. A method according to claim 12, further comprising carrying out solution purification on the nickel sulphate solution by oxidising iron contained in the nickel sulphate solution to trivalent iron and neutralizing the solution to a pH value of about 3 by contacting the nickel sulphate solution with a neutralisation and precipitation agent, whereupon the iron is precipitated out.

15. A method according to claim 14, wherein limestone is used as the neutralisation and precipitation agent.

16. A method according to claim 14 wherein lime milk is used as the neutralisation and precipitation agent.

17. A method according to claim 12, further comprising recovering nickel from the nickel sulphate solution by neutralising the solution to a pH value of about 7 by contacting the nickel sulphate solution with a neutralisation and precipitation agent, whereupon nickel is precipitated out.

18. A method according to claim 12, further comprising recovering nickel is recovered from the nickel sulphate solution by carbonate precipitation.

19. A method according to claim 12, wherein cobalt in the nickel-copper concentrate dissolves and co-precipitates with nickel.

* * * * *